US012740593B2

(12) United States Patent
Wang et al.

(10) Patent No.: US 12,740,593 B2
(45) Date of Patent: Sep. 22, 2026

(54) AEROSOL GENERATION APPARATUS

(71) Applicant: SHENZHEN FIRST UNION TECHNOLOGY CO., LTD., Shenzhen City (CN)

(72) Inventors: Jianping Wang, Shenzhen City (CN); Zhongli Xu, Shenzhen City (CN); Yonghai Li, Shenzhen City (CN)

(73) Assignee: SHENZHEN FIRST UNION TECHNOLOGY CO., LTD., Shenzhen City (CN)

(*) Notice: Subject to any disclaimer, the term of this patent is extended or adjusted under 35 U.S.C. 154(b) by 943 days.

(21) Appl. No.: 17/916,088

(22) PCT Filed: Mar. 30, 2021

(86) PCT No.: PCT/CN2021/084050

§ 371 (c)(1),
(2) Date: Sep. 30, 2022

(87) PCT Pub. No.: WO2021/197337

PCT Pub. Date: Oct. 7, 2021

(65) Prior Publication Data

US 2023/0157365 A1 May 25, 2023

(30) Foreign Application Priority Data

Mar. 30, 2020 (CN) ......................... 202020437195.7

(51) Int. Cl.
*A24F 40/20* (2020.01)
*A24F 40/465* (2020.01)
(Continued)

(52) U.S. Cl.
CPC ............ *A24F 40/465* (2020.01); *A24F 40/20* (2020.01); *A24F 40/485* (2020.01); *H05B 6/105* (2013.01)

(58) Field of Classification Search
None
See application file for complete search history.

(56) References Cited

U.S. PATENT DOCUMENTS 5,144,962 A * 9/1992 Counts ..................... A24D 1/20 131/194
9,986,769 B1 * 6/2018 Liu ......................... A24F 40/40
(Continued)

FOREIGN PATENT DOCUMENTS

CN 107920602 A 4/2018
CN 208941044 U 6/2019
(Continued)

OTHER PUBLICATIONS

English translation of Zhang et al. (CN 110771956A) (Year: 2020).*
(Continued)

*Primary Examiner* — Katherine A Will
(74) *Attorney, Agent, or Firm* — Scully, Scott, Murphy & Presser, P.C.

(57) ABSTRACT

An aerosol generation apparatus includes a heat insulation cylinder including an open end and a closed end is disposed within a housing; the heat insulation cylinder is internally provided with a tubular bracket, a tubular hollow of the bracket forming a cavity, and a smokable material being capable of being received within or removed from the cavity through the open end; a heater, in the shape of a pin or blade extending along the axial direction of the cavity; a first air medium layer, formed between the bracket and the heat insulation cylinder, for reducing heat conduction; and an airflow channel, including a first portion extending from the closed end to the open end within the first air medium layer, and a second portion extending from the open end to the closed end within the cavity.

19 Claims, 6 Drawing Sheets

(51) Int. Cl.
*A24F 40/485* (2020.01)
*H05B 6/10* (2006.01)

(56) References Cited

U.S. PATENT DOCUMENTS

| | | | |
|---|---|---|---|
| 2015/0208730 A1 | 7/2015 | Li et al. | |
| 2017/0055580 A1* | 3/2017 | Blandino | H05B 6/36 |
| 2018/0049472 A1 | 2/2018 | Mahler et al. | |
| 2020/0060338 A1 | 2/2020 | Danek | |
| 2021/0015154 A1 | 1/2021 | Jeong | |

FOREIGN PATENT DOCUMENTS

| | | |
|---|---|---|
| CN | 110710718 A | 1/2020 |
| CN | 209931485 U | 1/2020 |
| CN | 110742323 A | 2/2020 |
| CN | 110754695 A | 2/2020 |
| CN | 110771956 A | 2/2020 |
| CN | 110771959 A | 2/2020 |
| CN | 212279897 U | 1/2021 |
| WO | 2019/232666 A1 | 12/2019 |

OTHER PUBLICATIONS

Request for the Submission of an Opinion dated Jul. 1, 2025 received in Korean Patent Application No. 10-2022-7037991.

* cited by examiner

AEROSOL GENERATION APPARATUS

CROSS REFERENCE TO RELATED APPLICATIONS

The present application is a 35 U.S.C. § 371 National Phase conversion of International (PCT) Patent Application No. PCT/CN2021/084050, filed on Mar. 30, 2021, which claims priority to Chinese patent application No. 2020204371957, filed on Mar. 30, 2020 and entitled "AEROSOL GENERATION APPARATUS", which is incorporated herein by reference in its entirety. The PCT International Patent Application was filed and published in Chinese.

TECHNICAL FIELD

Embodiments of the present application relate to the field of heat-not-burn smoking sets, and in particular relates to an aerosol generation apparatus.

BACKGROUND

Smoking articles (e.g., cigarettes, cigars, etc.) burn tobacco during use to produce tobacco smoke. Attempts have been made to replace these articles that burn tobacco by making products that release compounds without burning.

Examples of such products are heating apparatuses, which release compounds by heating, rather than burning materials. For example, the material may be tobacco or other non-tobacco products, and the non-tobacco products may or may not contain nicotine. As another example, there is a heating apparatus that heats tobacco products by a heater to release compounds to form an aerosol. For example, Patent No. 201680049874.3, which is known in the art, proposes a heating apparatus for heating tobacco products by an electromagnetic induction type heater. When the above known apparatus is in use, heat from the heater is radiated or transferred radially outwards to the housing of the apparatus, thereby increasing the temperature of the housing.

SUMMARY

In order to solve the problem of temperature rising of the housing of the aerosol generation apparatus in the prior art, an embodiment of the present application provides an aerosol generation apparatus that prevents the temperature of the housing from rising.

Based on the above, the present application proposes an aerosol generation apparatus, for heating a smokable material to generate an aerosol for smoking, including a housing, where a heat insulation cylinder including an open end and a closed end is disposed in the housing; the heat insulation cylinder is internally provided with:

a bracket, configured as a tubular shape extending along the axial direction of the heat insulation cylinder, at least a part of a tubular hollow of the bracket forming a cavity, and a smokable material being capable of being at least partially received within or removed from the cavity through the open end;

a heater, configured as a pin or blade shape at least partially extending along the axial direction of the cavity;

a first air medium layer, formed around the cavity due to that a certain interval is kept between the bracket and the heat insulation cylinder, the first air medium layer being configured to reduce outward conduction of heat generated by the heater along the radial direction; and an airflow channel, including a first portion extending at least partially within the first air medium layer from the closed end to the open end, and a second portion extending within the cavity from the open end to the closed end.

In a preferred embodiment, the bracket is provided with an air hole close to the open end, and the first portion and the second portion are converged at the position, close to the open end, within the heat insulation cylinder through the air hole.

In a preferred embodiment, the heater is a susceptor that is penetrated by a varying magnetic field to generate heat, thereby heating the smokable material.

In a preferred embodiment, the aerosol generation apparatus further includes an extractor configured as a cylinder shape extending along the axial direction of the cavity, the smokable material is at least partially received within or removed from the cavity through the open end under the retention of the extractor, and the second portion is configured to extend between an outer surface of the extractor and an inner surface of the bracket along the radial direction of the cavity.

In a preferred embodiment, the airflow channel further includes a third portion extending within the extractor from the closed end to the open end.

In a preferred embodiment, the third portion and the second portion are converged at the portion, close to the closed end, of the cavity.

In a preferred embodiment, the heat insulation cylinder is provided with an air inlet close to the closed end, the first portion is in airflow communication with the air inlet, and the heat insulation cylinder is configured to only allow external air to enter the heat insulation cylinder from the air inlet.

In a preferred embodiment, the heat insulation cylinder is configured to prevent air or aerosol inside the heat insulation cylinder from exiting other than through the open end when in use.

In a preferred embodiment, the heat insulation cylinder is further provided with a retaining portion extending outwards along the radial direction, and is stably retained in the housing by the retaining portion.

In a preferred embodiment, a certain interval is kept between the heat insulation cylinder and the housing along the radial direction to form a second air medium layer, and the second air medium layer is configured to reduce conduction of heat generated by the heater to the housing.

In the above aerosol generation apparatus, a heating mechanism is separated from the space inside the housing by the heat insulation cylinder, an airflow structure enables air inside the housing to flow back and forth after entering the heat insulation cylinder and then exit by smoking, diffused heat is recovered as much as possible, and the surface temperature of the housing can be reduced while a heat utilization rate is increased. Due to the design of the heat insulation cylinder, the air can only flow unidirectionally, convection between the air in the heating portion and the housing is prevented, and convection diffusion of the heat is effectively restrained.

BRIEF DESCRIPTION OF DRAWINGS

One or more embodiments are illustrated by pictures in the corresponding accompanying drawings, which are not intended to limit the embodiments, in which elements having the same reference numerals represent similar elements, and the figures of the accompanying drawings are not intended to constitute a scale limitation unless specifically stated otherwise.

DETAILED DESCRIPTION

To facilitate the understanding of the present application, the application will be described in more detail below with reference to the accompanying drawings and specific implementation.

An embodiment of the present application proposes an aerosol generation apparatus that heats, rather than burns, a smokable material such as a cigarette, to volatilize or release at least one component of the smokable material to form an aerosol for smoking.

In a preferred embodiment, heating of the smokable material by the aerosol generation apparatus is performed by means of electromagnetic induction type heating. For example, by using a varying magnetic field formed by a magnetic field generator, a susceptor in the magnetic field is induced to generate an eddy current effect to generate heat, thereby heating the smokable material to volatilize at least one volatile component to generate an aerosol for smoking.

Figure 1:
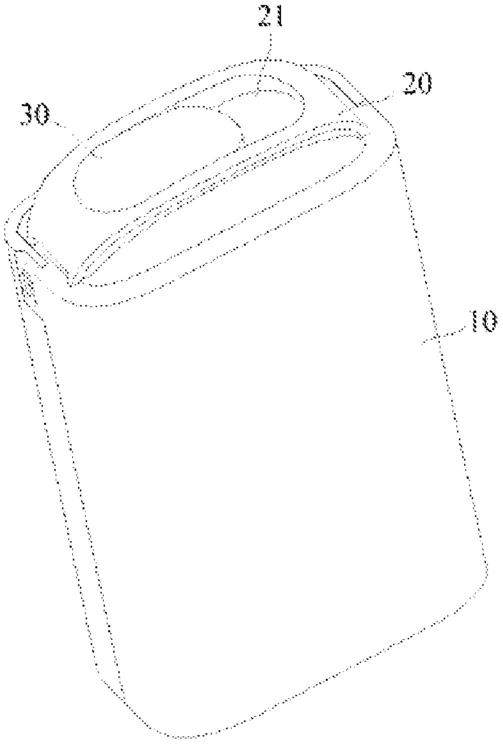
FIG. 1 is a schematic diagram of an aerosol generation apparatus according to an embodiment.
Figure 2:
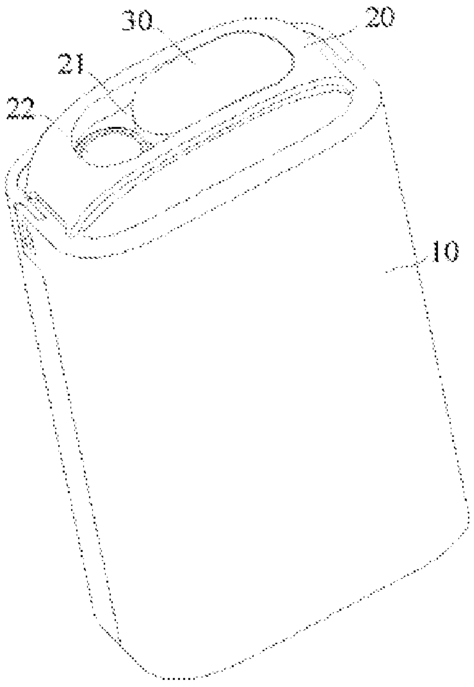
FIG. 2 is a schematic diagram of the aerosol generation apparatus of FIG. 1 in another state.
Figure 3:
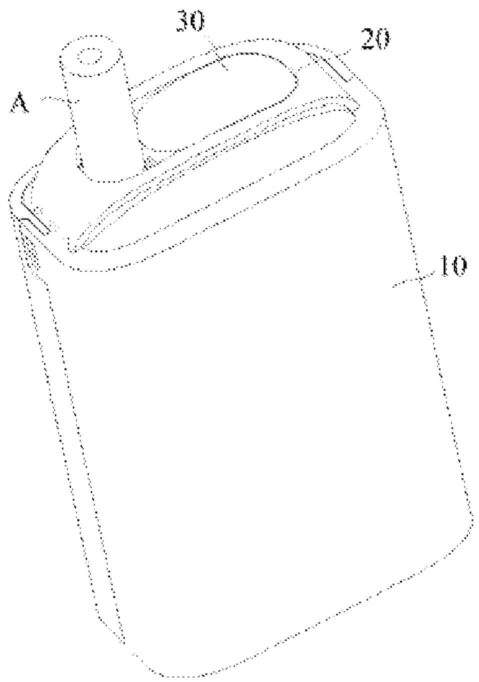
FIG. 3 is a schematic diagram of the aerosol generation apparatus of FIG. 2 in use.

Configuration of an aerosol generation apparatus according to an embodiment of the present application can be seen in FIG. 1 to FIG. 3. The entire appearance of the apparatus is generally configured as a flat cylinder shape. Outer components of the aerosol generation apparatus include:

- a housing 10, having a hollow structure inside and thus forming an assembly space for induction heating and other necessary functional components; and
- an upper cover 20 located at the upper end of the housing 10 along the length direction. On one hand, the upper cover 20 can cover the upper end of the housing 10, such that the appearance of the aerosol generation apparatus is complete and attractive; and on the other hand, the apparatus can be disassembled from the upper end of the housing 10, thereby facilitating assembly, disassembly and replacement of each functional component inside the housing 10.

It can be further seen from FIG. 1 and FIG. 3 that the upper cover 20 is provided with a sliding groove 21 extending along the width direction, and an opening 22. A movable cover 30 is disposed in the sliding groove 21 and can slide along the extending direction of the sliding groove so as to open or close the opening. When in use, the smokable material A may be at least partially received within the housing 10 along the length direction of the housing 10 through the opening 22 to be heated, or may be removed from the housing 10 through the opening 22.

Figure 4:
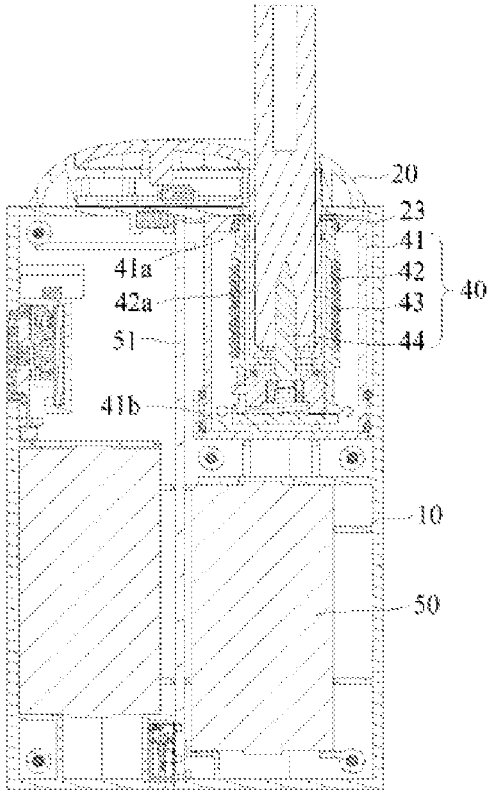
FIG. 4 is a schematic diagram of a cross section of the aerosol generation apparatus of FIG. 3.

Further referring to FIG. 4, the housing 10 is internally provided with:

- a battery cell 50 for supplying power; and
- a control circuit board 51, integrated with a circuit and configured to control the operation of the aerosol generation apparatus.

Figure 5:
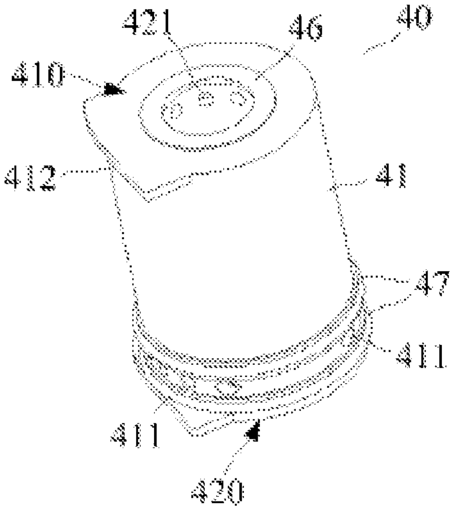
FIG. 5 is a schematic diagram of a heating mechanism in FIG. 4.

In order to achieve heating of the smokable material A, a heating mechanism 40 is disposed within the housing 10, and the form and configuration of the heating mechanism 40 after assembly can be seen in FIG. 5. The heating mechanism 40 is of a cylindrical structure having an opening in the upper end after entire assembly, and is installed within the housing 10 along the length direction of the housing 10, for receiving and heating the smokable material A.

Specifically, the heating mechanism 40 includes:

- a heat insulation cylinder 41, located on the outer layer along the radial direction, the heat insulation cylinder 41 being provided with an open end 41*a* and a closed end 41*b*, and the open end 41*a* and the closed end 41*b* being respectively located at two ends of the heat insulation cylinder 41; where the heat insulation cylinder 41 is preferably prepared from materials with a relatively low heat conductivity coefficient such as PEEK and ceramic, and a certain interval is reserved between the inner wall of the housing 10 and the heat insulation cylinder 41 in implementation, for reserving air as a medium, and further utilizing the low heat conductivity coefficient of the air to reduce outward conduction of heat;
- a bracket 42, located within the heat insulation cylinder 41 along the radial direction, the bracket being configured as a tubular shape extending in the length direction of the heat insulation cylinder 41, and at least a part of the tubular hollow of the bracket forming a cavity 42*a* for receiving the smokable material A; where similarly, a certain interval is also reserved between the bracket 42 and the heat insulation cylinder 41, and the air is reserved as a medium to form a first air medium layer, thereby further utilizing the low heat conductivity coefficient of the air to reduce outward conduction of heat;
- an induction coil 43, disposed outside the bracket 42 and having a helical design extending along the axial direction of the bracket 42, for generating an alternating magnetic field when an alternating current is supplied; and
- a heater, configured as a pin or blade shape at least partially extending within the cavity along the axial direction of the bracket 42. In some embodiments, the heater is a susceptor 44 that can be penetrated by the alternating magnetic field generated by the induction coil 43 to generate heat, and thus can be inserted into the smokable material A for heating when the smokable material A is received within the cavity.

Figure 7:
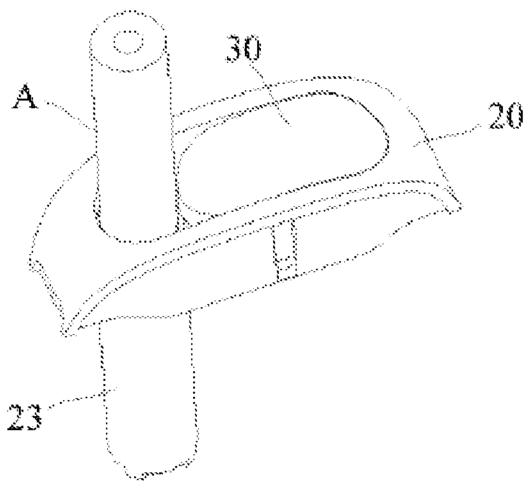
FIG. 7 is a schematic diagram of an extractor extracting a smokable material.
Figure 8:
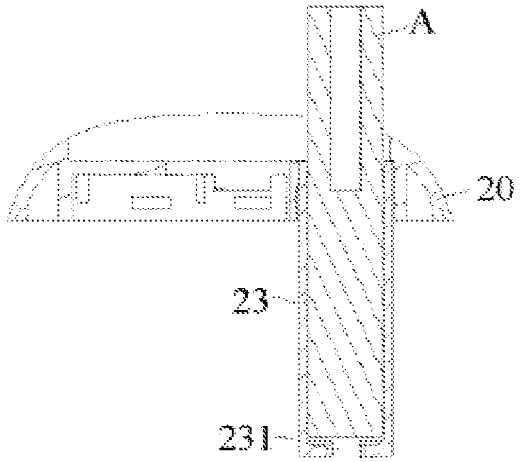
FIG. 8 is a schematic diagram of a cross section of the extractor extracting the smokable material of FIG. 7.

Further referring to FIG. 4, FIG. 7 and FIG. 8, in order to facilitate extraction of the smokable material A when in use, the upper cover 20 is also provided with an extractor 23 extending towards the heating mechanism 40, where the extractor 23 is configured as a cylindrical shape extending along the length direction, when in use, the smokable material A is retained within the extractor 23 and stretches into the cavity of the bracket 42 from the opening in the upper end of the heating mechanism 40, and after smoking is complete, the smokable material A, retained by the extractor 23, can be removed by lifting the upper cover 20 upwards. Certainly, in the implementation, a hole 231 through which the susceptor 44 can pass is formed in the lower bottom end of the extractor 23, such that the susceptor 44 can pass through the hole 231 into the smokable material A retained within the extractor 23 for heating when in use.

Figure 6:
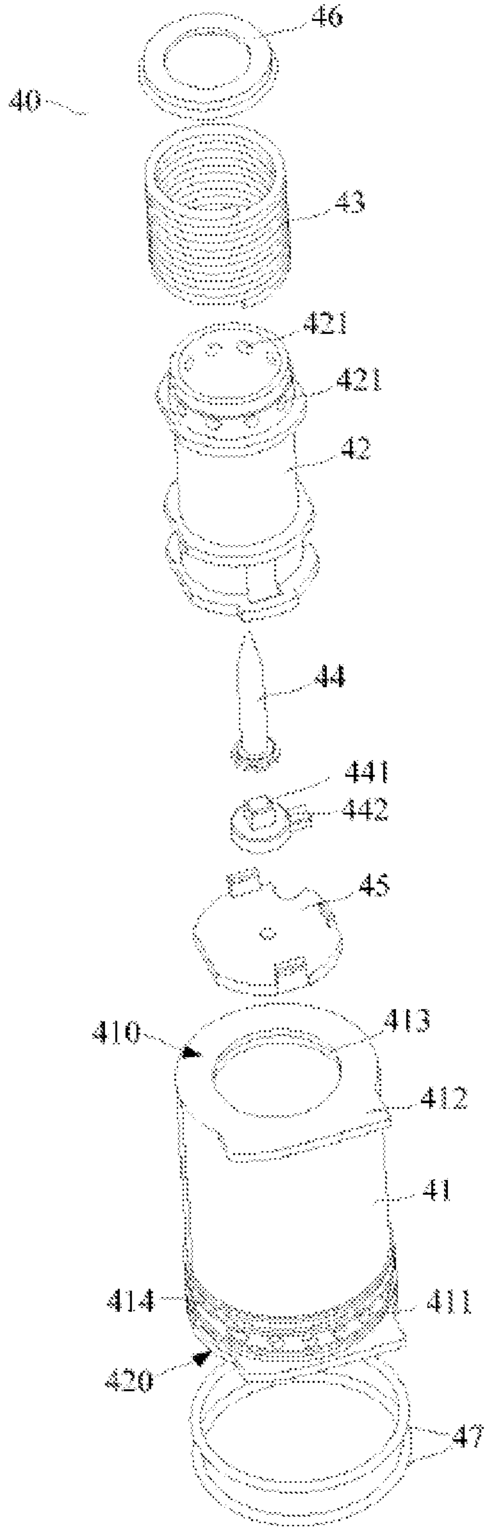
FIG. 6 is an exploded schematic diagram of components of the heating mechanism of FIG. 5 before assembly.

Further referring to FIG. 5 and FIG. 6, the heat insulation cylinder 41 is provided with an upper end 410 and a lower end 420 opposite to each other along the length direction, where the upper end 410 has an opening 413, the opening 43 is configured to be inserted by the extractor 23, and the lower end is closed. Meanwhile, in order to keep the airtightness in use, a silica gel ring 46 is disposed within the opening 413, which is configured to flexibly fit the outer wall of the extractor 23 after the extractor 23 is inserted, and prevent the internal air or aerosol from escaping through the opening 413 and prevent the outside air from entering through the opening 413.

Furthermore, in terms of airflow design, a first air hole 411 is formed in the position, close to the lower end 420, of the heat insulation cylinder 41, and the first air hole 411 is in airflow communication with structures such as an airflow gap or an air inlet in the housing 10, such that the external air can only enter the heating mechanism 40 through the first air hole 411 during a smoking process.

A second air hole 421 is formed in the position, close to the upper end 410 of the heat insulation cylinder 41, of the bracket 42, such that the air entering through the first air hole 411 can only enter the cavity of the bracket 42 through the second air hole 421.

Figure 9:
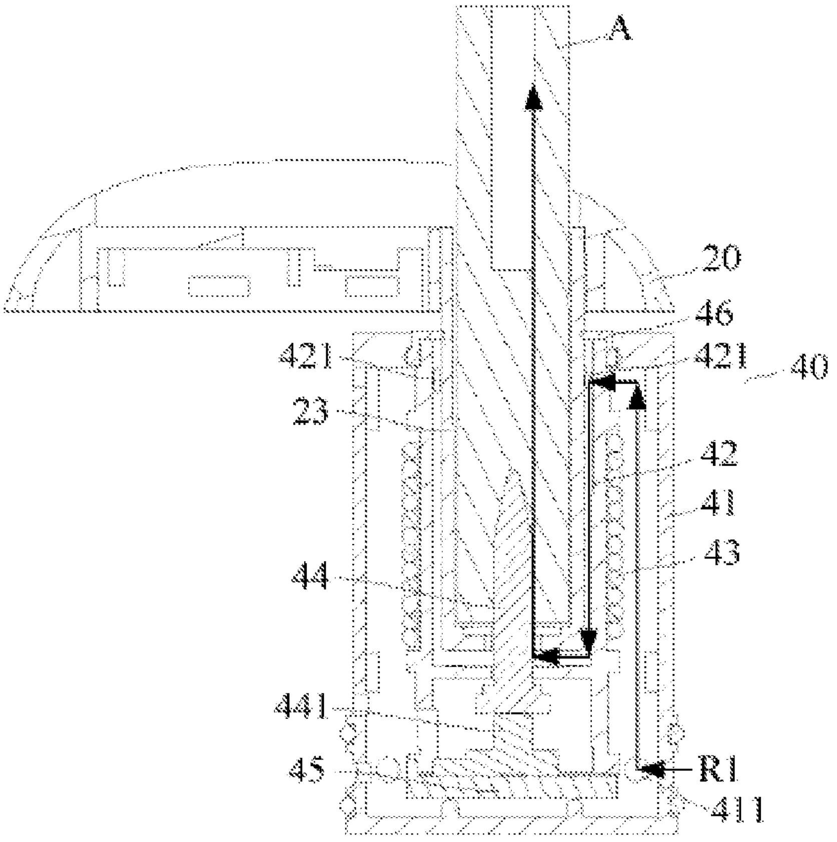
FIG. 9 is a schematic diagram of an airflow path of the aerosol generation apparatus of FIG. 4 when in use.

An airflow path during a smoking process can be seen in FIG. 9. After entering the heat insulation cylinder 41 through the first air hole 411, the air flows upwards within an air layer between the heat insulation cylinder 41 and the bracket 42 to the second air hole 421 and enters the bracket 42, then moves downwards from the second air hole 421 to the bottom of the cavity, and enters the smokable material A through a gap between the susceptor 30 and the hole 231 of the extractor 23, thereby finally being smoked by a user.

In the preferred embodiment shown in FIG. 6, a temperature sensor 441 for sensing a temperature of the susceptor 44 is also disposed within the bracket 42. The temperature sensor 441 is installed by abutting against the bottom of the susceptor 44, and meanwhile, a flexible silica gel sheet 442 is also disposed within the bracket 42, for providing a resilient force to keep the temperature sensor 441 and the susceptor 44 in close contact all the time, so as to prevent looseness from causing a gap to affect the accuracy of temperature measurement.

Meanwhile, an end cover 45 is further disposed at the lower end of the bracket 42 for sealing the lower end of the bracket 42 and supporting the susceptor 44, the temperature sensor 441 and the flexible silica gel sheet 442, such that the susceptor, the temperature sensor and the flexible silica gel sheet can be stably packaged in the bracket 42.

In the preferred embodiment shown in FIG. 6, the heat insulation cylinder 41 is further provided with a connecting portion 412 extending outwards along the radial direction, and when in use, an abutment, clamping, or other retaining structure in cooperation with the connecting portion 412 is disposed in the housing 10 such that the heating mechanism 40 is retained in the housing 10.

Meanwhile, at least two silicone rings 47 relatively protruding from the outer surface of the heat insulation cylinder 41 are further disposed at the position, close to the lower end 420, of the heat insulation cylinder, and mounting grooves 414 assisting in installation of the silicone rings 47 are correspondingly disposed to facilitate installation of the heat insulation cylinder 41. It can be seen from FIG. 6 that the silicone rings 47 are respectively disposed on upper and lower sides of the first air hole 411. When in use, after assembly, a gap is kept between the first air hole 411 and the inner wall of the housing 10 by flexible support, without being blocked all the time, and thus smooth air intake can be realized.

On the basis of actual data in implementation, a comparison test is performed on the heating mechanism 40 having the heat insulation cylinder 41 and the heating apparatus not having the heat insulation cylinder 41 in smoking. According to the above aerosol generation apparatus having the heat insulation cylinder 41, after three cigarettes are continuously smoked, the highest temperature of the housing can be reduced by 5-13° C.

In the above aerosol generation apparatus, a heating mechanism is separated from the space inside the housing by the heat insulation cylinder, an airflow structure enables air inside the housing to flow back and forth after entering the heat insulation cylinder and then exit by smoking, diffused heat is recovered as much as possible, and the surface temperature of the housing can be reduced while a heat utilization rate is increased. Due to the design of the heat insulation cylinder, the air can only flow unidirectionally, convection between the air in the heating portion and the housing is prevented, and convection diffusion of the heat is effectively restrained.

It should be noted that the preferred embodiments of the present application are given in the description and the accompanying drawings of the present application, but are not limited to the embodiments described in the description, and furthermore, for those of ordinary skill in the art, improvements or transformations can be made according to the above description, and all these improvements and transformations should fall within the protection scope of the appended claims of the present application.

What is claimed is:

1. An aerosol generation apparatus, for heating a smokable material to generate an aerosol for smoking, comprising a housing, wherein a heat insulation cylinder comprising an open end and a closed end is disposed in the housing; the heat insulation cylinder is internally provided with:

a bracket, configured as a tubular shape extending along an axial direction of the heat insulation cylinder, at least a part of a tubular hollow of the bracket forming a cavity, and the smokable material being capable of being at least partially received within or removed from the cavity through the open end;

a heater, configured as a pin or blade shape at least partially extending along the axial direction of the cavity;

a first air medium layer, surrounding the cavity due to that a certain interval is kept between the bracket and the heat insulation cylinder, the first air medium layer being configured to reduce outward conduction of heat generated by the heater along a radial direction; and an airflow channel, comprising a first portion extending at least partially within the first air medium layer from the closed end to the open end, and a second portion extending within the cavity from the open end to the closed end.

2. The aerosol generation apparatus according to claim 1, wherein the bracket comprises an air hole close to the open end, and the first portion and the second portion are converged at a position, close to the open end, within the heat insulation cylinder through the air hole.

3. The aerosol generation apparatus according to claim 2, wherein the heater is a susceptor that is penetrated by a varying magnetic field to generate heat, thereby heating the smokable material.

4. The aerosol generation apparatus according to claim 2, further comprising an extractor configured as a cylinder shape extending along the axial direction of the cavity, wherein the smokable material is at least partially received within or removed from the cavity through the open end under the retention of the extractor; and the second portion is configured to extend between an outer surface of the extractor and an inner surface of the bracket along the radial direction of the cavity.

5. The aerosol generation apparatus according to claim 4, wherein the airflow channel further comprises a third portion extending within the extractor from the closed end to the open end.

6. The aerosol generation apparatus according to claim 5, wherein the third portion and the second portion are converged at a position, close to the closed end, of the cavity.

7. The aerosol generation apparatus according to claim 2, wherein the heat insulation cylinder is provided with an air inlet close to the closed end, the first portion is in airflow communication with the air inlet, and the heat insulation cylinder is configured to only allow external air to enter the heat insulation cylinder from the air inlet.

8. The aerosol generation apparatus according to claim 2, wherein the heat insulation cylinder is configured to prevent air or aerosol inside the heat insulation cylinder from exiting other than through the open end when in use.

9. The aerosol generation apparatus according to claim 2, wherein the heat insulation cylinder is further provided with a retaining portion extending outwards along the radial direction, and is stably retained in the housing by the retaining portion.

10. The aerosol generation apparatus according to claim 2, wherein a certain interval is kept between the heat insulation cylinder and the housing along the radial direction to form a second air medium layer, and the second air medium layer is configured to reduce conduction of heat generated by the heater to the housing.

11. The aerosol generation apparatus according to claim 2, wherein the bracket comprises a sidewall, and the air hole is a through hole extending from a first surface of the sidewall to a second surface of the sidewall.

12. The aerosol generation apparatus according to claim 1, wherein the heater is a susceptor that is penetrated by a varying magnetic field to generate heat, thereby heating the smokable material.

13. The aerosol generation apparatus according to claim 1, further comprising an extractor configured as a cylinder shape extending along the axial direction of the cavity, wherein the smokable material is at least partially received within or removed from the cavity through the open end under the retention of the extractor; and the second portion is configured to extend between an outer surface of the extractor and an inner surface of the bracket along the radial direction of the cavity.

14. The aerosol generation apparatus according to claim 13, wherein the airflow channel further comprises a third portion extending within the extractor from the closed end to the open end.

15. The aerosol generation apparatus according to claim 14, wherein the third portion and the second portion are converged at a position, close to the closed end, of the cavity.

16. The aerosol generation apparatus according to claim 1, wherein the heat insulation cylinder is provided with an air inlet close to the closed end, the first portion is in airflow communication with the air inlet, and the heat insulation cylinder is configured to only allow external air to enter the heat insulation cylinder from the air inlet.

17. The aerosol generation apparatus according to claim 1, wherein the heat insulation cylinder is configured to prevent air or aerosol inside the heat insulation cylinder from exiting other than through the open end when in use.

18. The aerosol generation apparatus according to claim 1, wherein the heat insulation cylinder is further provided with a retaining portion extending outwards along the radial direction, and is stably retained in the housing by the retaining portion.

19. The aerosol generation apparatus according to claim 1, wherein a certain interval is kept between the heat insulation cylinder and the housing along the radial direction to form a second air medium layer, and the second air medium layer is configured to reduce conduction of heat generated by the heater to the housing.

* * * * *